(12) United States Patent
Hu et al.

(10) Patent No.: US 8,534,634 B2
(45) Date of Patent: Sep. 17, 2013

(54) SUPPORT MECHANISM

(75) Inventors: Wu-Zhu Hu, Shenzhen (CN);
Ben-Xiang Zhao, Shenzhen (CN);
Wu-Qi Li, Shenzhen (CN); Tang Li,
Shenzhen (CN)

(73) Assignees: **Hong Fu Jin Precision Industry
(ShenZhen) Co., Ltd.**, Shenzhen (CN);
Hon Hai Precision Industry Co., Ltd.,
New Taipei (TW)

( * ) Notice: Subject to any disclaimer, the term of this patent is extended or adjusted under 35 U.S.C. 154(b) by 0 days.

(21) Appl. No.: 13/325,138

(22) Filed: Dec. 14, 2011

(65) Prior Publication Data

US 2013/0001393 A1 Jan. 3, 2013

(30) Foreign Application Priority Data

Jun. 28, 2011 (CN) .......................... 2011 1 0177013

(51) Int. Cl.
*A47G 29/00* (2006.01)
*A47G 23/02* (2006.01)
*A47B 97/04* (2006.01)
*A45D 19/04* (2006.01)
*F16M 11/38* (2006.01)
*F16M 13/00* (2006.01)

(52) U.S. Cl.
USPC ........ 248/371; 248/155.4; 248/460; 248/463; 248/464; 248/447; 248/370; 248/188.6; 248/166; 248/473; 248/533; 248/150; 248/165; 248/407; 248/434; 248/596; 16/2.4

(58) Field of Classification Search
USPC .............. 248/371, 155.4, 460, 463, 464, 461, 248/447, 370, 163.1, 188.6, 166, 923, 456, 248/473, 533, 150, 165, 407, 434, 687, 188.8, 248/596, 42; 16/2.4; 403/119
See application file for complete search history.

(56) References Cited

U.S. PATENT DOCUMENTS

| | | | | |
|---|---|---|---|---|
| 2,265,579 A * | 12/1941 | Schuck | ........................... | 40/748 |
| 2,511,187 A * | 6/1950 | Weidauer | ....................... | 30/230 |
| 4,105,176 A * | 8/1978 | Hill et al. | ....................... | 248/676 |
| 4,247,072 A * | 1/1981 | McMahan, Sr. | .............. | 248/582 |
| 5,029,784 A * | 7/1991 | Blahout | ........................ | 248/166 |
| 5,083,734 A * | 1/1992 | Ancona et al. | ................. | 248/687 |
| 5,511,758 A * | 4/1996 | Hsu | ................ | 248/461 |
| D398,458 S * | 9/1998 | Martell | ......................... | D6/420 |
| 6,797,872 B1 * | 9/2004 | Catalano et al. | ................ | 84/454 |
| 7,546,992 B1 * | 6/2009 | Cappolina | ..................... | 248/166 |
| D596,187 S * | 7/2009 | Martell | ........................ | D14/447 |
| D620,941 S * | 8/2010 | Stacey et al. | .................. | D14/447 |
| 8,020,818 B2 * | 9/2011 | Chou et al. | ................. | 248/176.1 |
| 8,186,639 B2 * | 5/2012 | Wang | ............................ | 248/371 |
| 2008/0056840 A1 * | 3/2008 | Hitchcock | ........................ | 411/45 |
| 2009/0101789 A1 * | 4/2009 | Chen | ........................ | 248/687 |
| 2009/0140119 A1 * | 6/2009 | To et al. | ........................ | 248/455 |

* cited by examiner

*Primary Examiner* — Terrell McKinnon
*Assistant Examiner* — Christopher Garft
(74) *Attorney, Agent, or Firm* — Altis & Wispro Law Group, Inc.

(57) ABSTRACT

A support mechanism for supporting an electronic device is disclosed. The support mechanism comprises two support assemblies detachably assembled together, each support assembly comprising an adjustable member defining a latching groove; and a support member rotatably connected to the adjusting member, the support member of one of the two support assemblies being capable of being partially received in the latching groove of the adjustable member of another one of the two support assemblies.

18 Claims, 7 Drawing Sheets

SUPPORT MECHANISM

BACKGROUND

1. Technical Field

The present disclosure relates to support mechanisms, and more particularly, to a support mechanism for supporting an electronic device.

2. Description of Related Art

Electronic devices such as tablet PCs and electronic books readers are popular due to their portability and a multiplicity of entertainment functions. When in use, such an electronic device may be handheld or set on a desk or a lap. This may not achieve an optimum display angle and is also often inconvenient. In order to solve the problem, a plurality of support mechanisms is provided to support the electronic device. However, these support mechanisms are generally complicated and even in a folded state these support mechanisms are relatively large, thus it is inconvenient to carry such support mechanisms.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
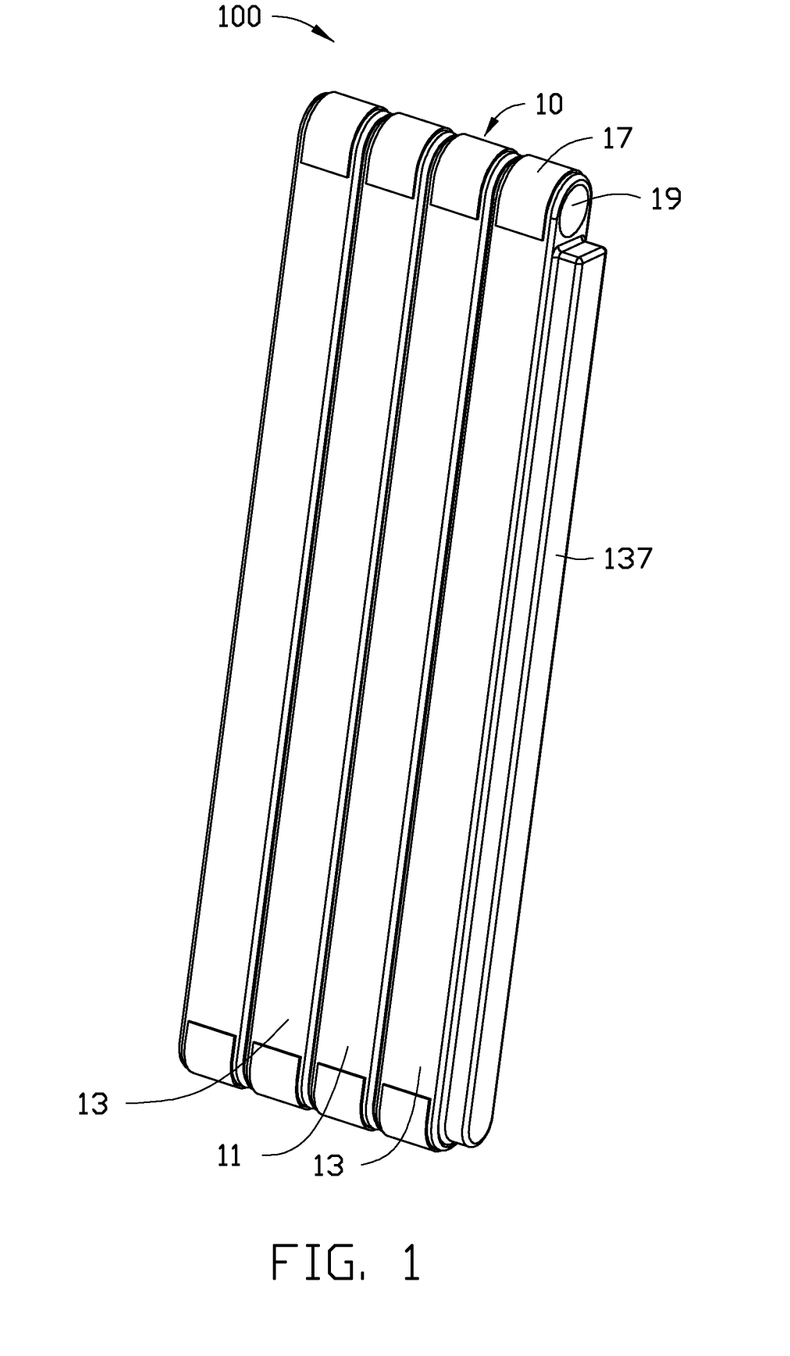
FIG. 1 is an isometric view of an embodiment of a support mechanism in a folded state, the support mechanism including two support assemblies.
Figure 2:
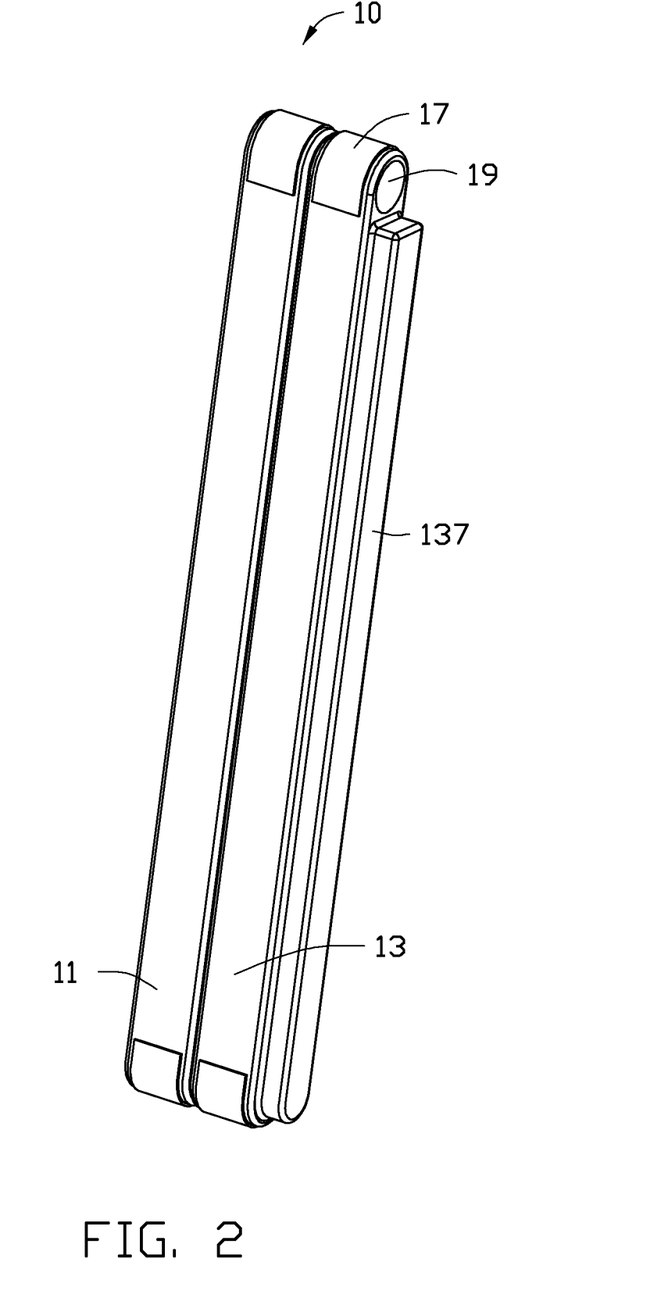
FIG. 2 is an isometric view of the support assembly of the support mechanism of FIG. 1.
Figure 3:
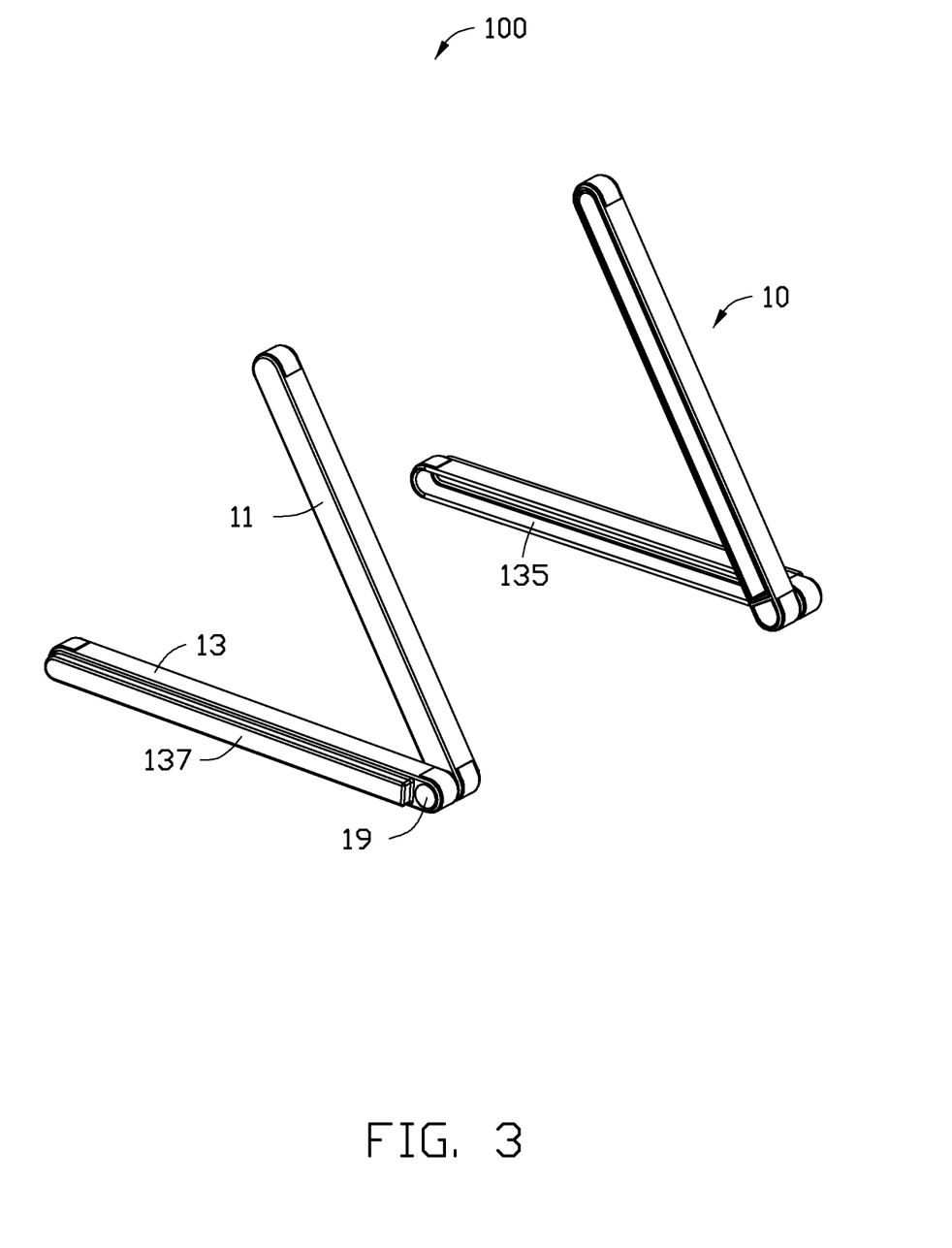
FIG. 3 is an isometric view of the assembled support mechanism of FIG. 1.
Figure 5:
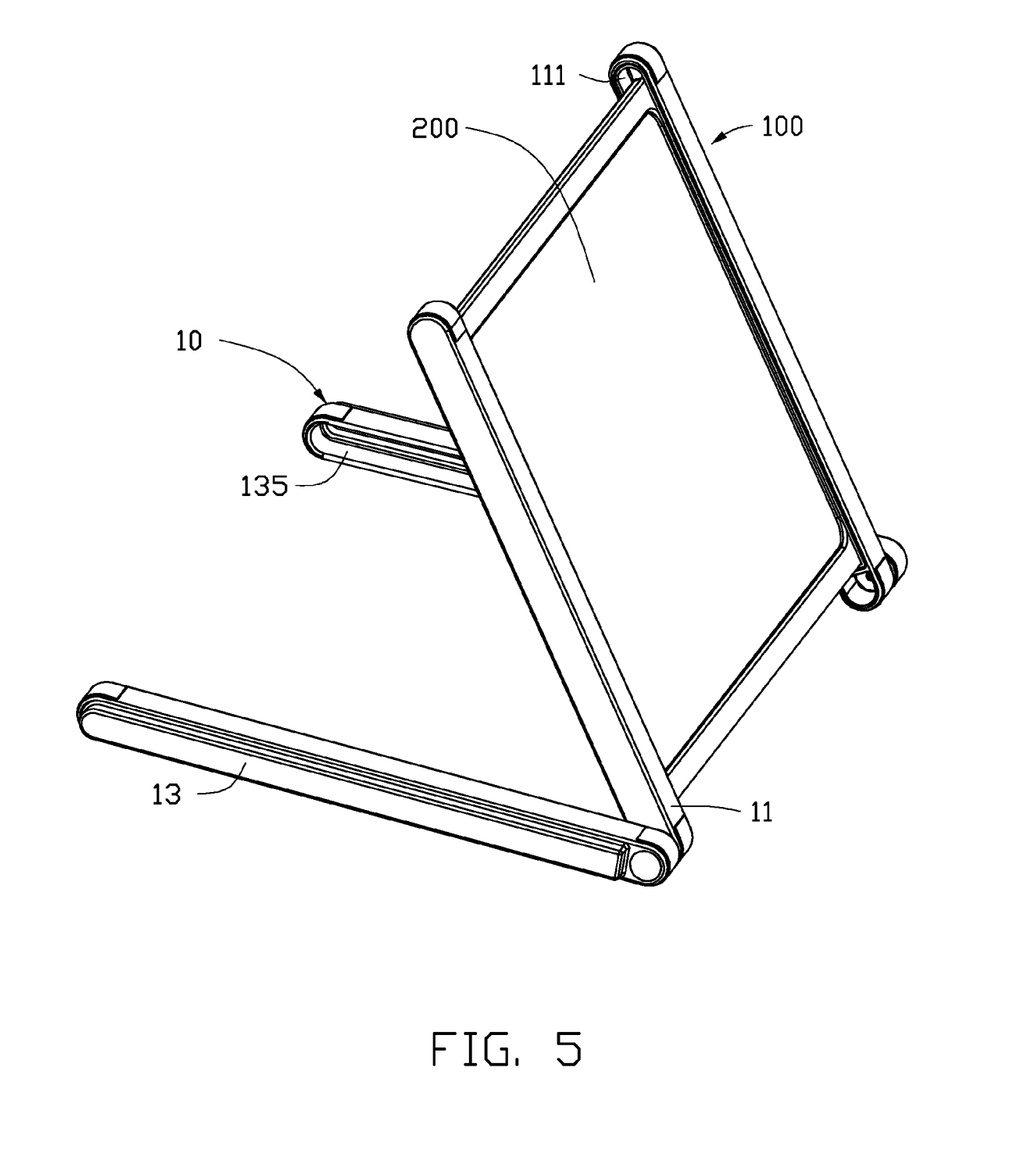
FIG. 5 is an isometric view of the support mechanism of FIG. 1 supporting a tablet PC in a first support state.
Figure 6:
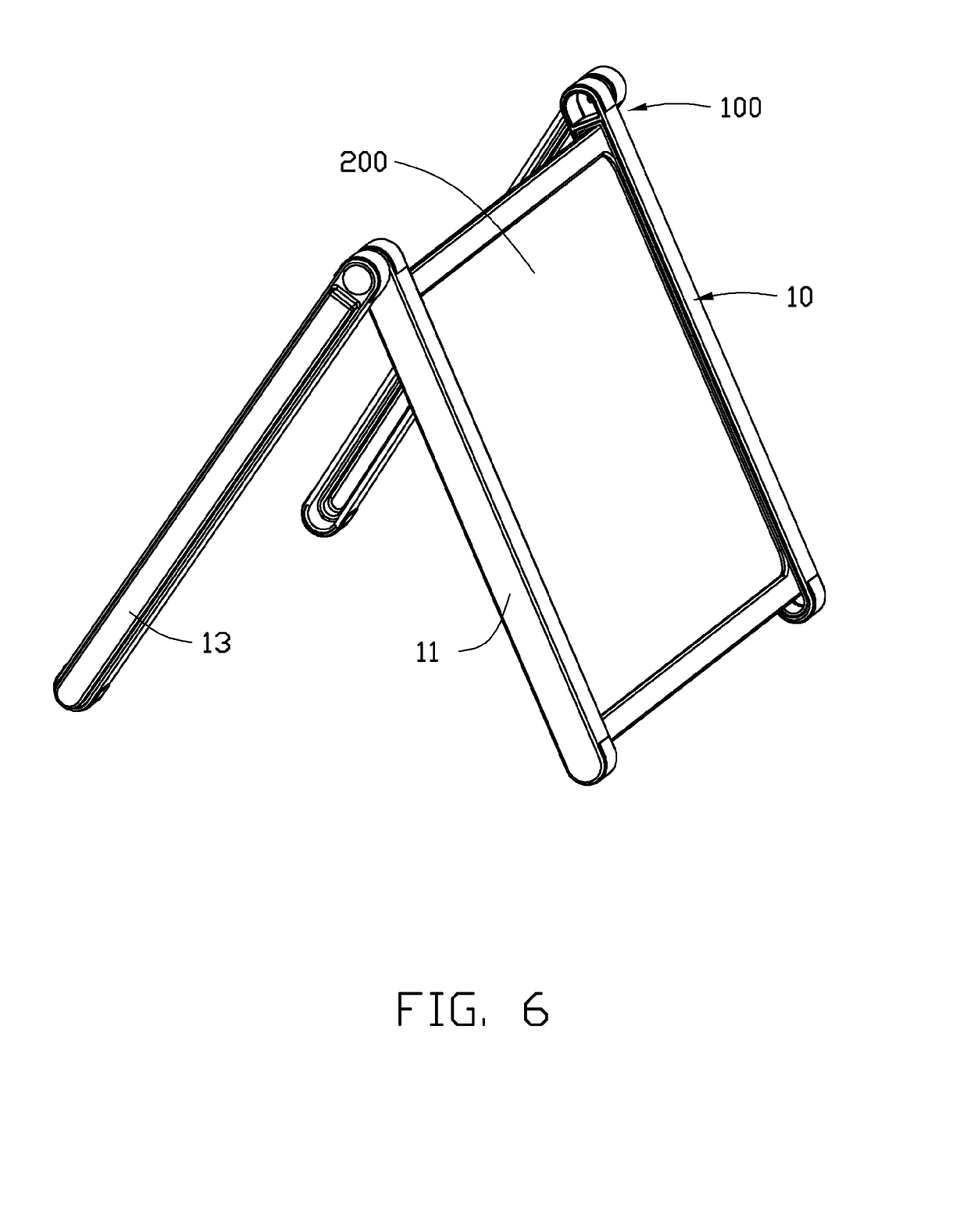
FIG. 6 is an isometric view of the support mechanism of FIG. 1 in a second support state.

Referring to FIGS. 1 through 3, an embodiment of a support mechanism 100 includes two support assemblies 10. The two support assemblies 10 are detachably assembled together. The support mechanism 100 can be folded and assembled into a flat rectangle shape for carrying, such as shown in FIG. 1. The support mechanism 100 can be unfolded into a variety of support states, to support an electronic device, such as shown in FIGS. 5-6. The support mechanism 100 may be used to support a tablet PC or an electronic book reader. In the embodiment, the support mechanism 100 is used for supporting a electronic device 200.

Figure 4:
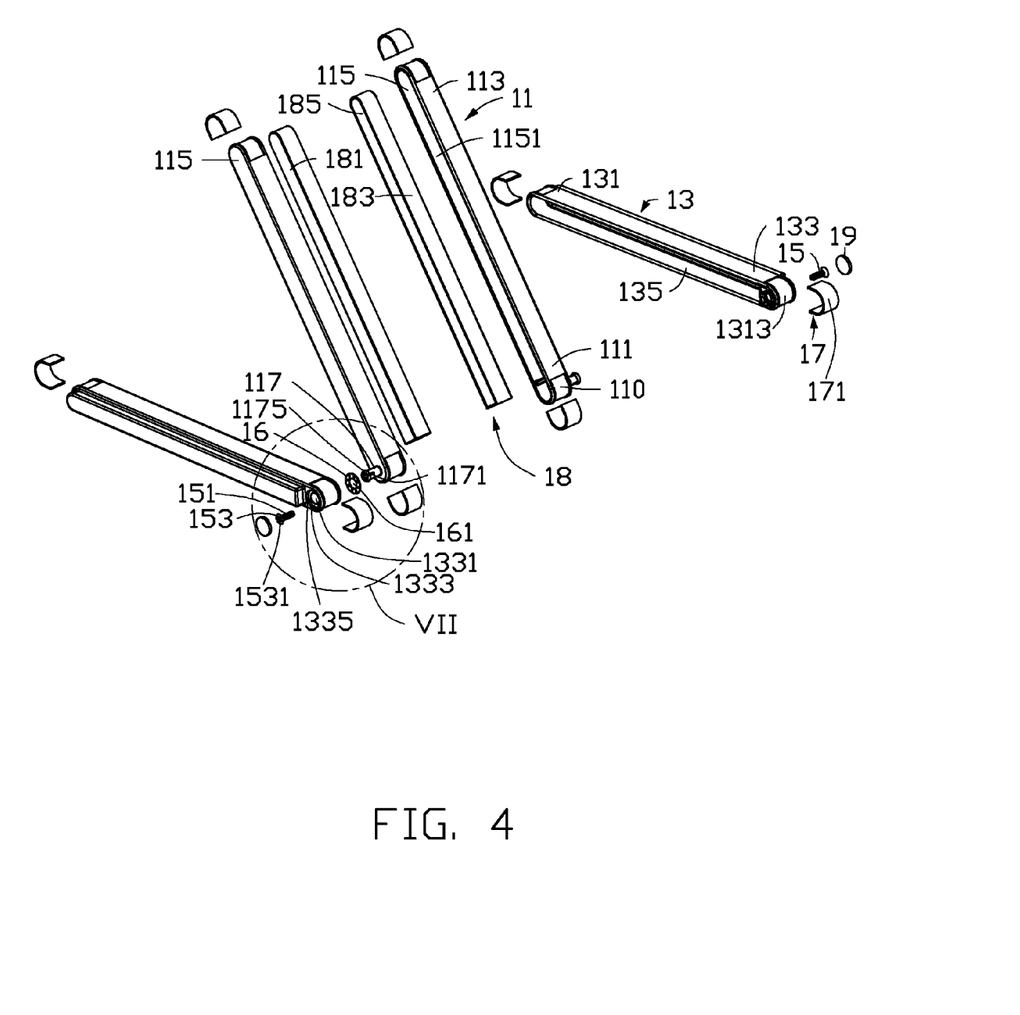
FIG. 4 is an exploded, isometric view of the support mechanism of FIG. 3.

Referring to FIGS. 3 and 4, each of the two support assemblies 10 includes an adjustable member 11, a support member 13, a pivotal member 15, a resisting plate 16, a plurality of anti-skid members 17, a positioning sleeve 18 and a sealing cover 19. The adjustable member 11 and the support member 13 are rotatably connected to each other. The adjustable member 11 is a substantially square bar, including a joint end 111, a support end 113 and two side surfaces 115 connecting the joint end 111 and the support end 113. The joint end 111 and the support end 113 are smoothly rounded, and each defines an arcuate groove 119 to receive one of the plurality of anti-skid members 17. The adjustable member 11 further defines a latching groove 1151 on one of the two side surfaces 115 and includes a locking portion 117 extending from the joint end 111. The locking portion 117 is substantially perpendicular to each of the two side surfaces 115.

The locking portion 117 is substantially cylindrical, and axially defines a receiving hole 1171 and includes a thread (not shown) along the periphery of the receiving hole 1171. The locking portion 117 further forms a plurality of claws 1175 away from the joint end 111. The plurality of claws 1175 are located around the periphery of an end of the locking portion 117 and extend outwardly along the radial direction of the locking portion 117. The plurality of claws 1175 are flexible and capable of being bent inward.

The support member 13 is similar to the adjustable member 11 and includes a resisting end 131 and a connecting end 133 opposite to the resisting end 131, each has a smoothly rounded end defining an arcuate groove 1313. The arcuate groove 1313 extends along end surface and has an even depth for receiving one of the plurality of anti-skid members 17. The connecting end 133 defines a locking hole 1331 extending though opposite side surfaces, and includes a first resisting portion 1333 and a second resisting portion 1335. The first resisting portion 1333 and the second resisting portion 1335 are positioned side by side and cooperatively form a stepped annular structure. The first resisting portion 1333 is at the end of the locking hole 1331, the second resisting portion 1335 is separated from the locking hole 1331 by the first resisting portion 1333. The internal diameter of the second resisting portion 1335 is greater than that of the first resisting portion 1333. The support member 13 defines a groove 135 on a first side surface and includes a protrusion 137 on a second side surface opposite to the first side surface. The groove 135 extends along the length direction of the support member 13 and has a substantially rectangular shape. The protrusion 137 is in a rectangular shape corresponding to the latching groove 1151.

The pivotal member 15 includes an engaging portion 151 and an adjusting portion 153 opposite to the engaging portion 151. The adjusting portion 153 defines a driving groove 1531 on the end surface away from the engaging portion 151. In the embodiment, the pivotal member 15 is a cross recess head screw. The resisting plate 16 is an annular washer and defines a center hole 161 corresponding to the locking portion 117. The resisting plate 16 is sleeved on the locking portion 117, and resisted between the adjustable member 11 and the support member 13 to enable the adjustable member 11 to smoothly rotate relative to the support member 13.

The plurality of anti-skid members 17 are strips of sticky materials received in the arcuate grooves 119, 1313 and each includes a frictional surface 171 with a high friction coefficient. The frictional surface 171 deviates from the bottom of the arcuate grooves 119, 1313. The plurality of anti-skid members 17 are capable of maintaining the two support assemblies 10 on a desk via the frictional surface 171 sitting on a desk. In the embodiment, each of the plurality of anti-skid members 17 is arced and made of silica gel.

The positioning sleeve 18 is received in the latching groove 1151, and includes a bottom plate 181 and a plurality of sidewalls 183 extending from edges of the bottom plate 181 toward a predetermined direction. The bottom plate 181 and the plurality of sidewalls 183 cooperatively define a latching chamber 185 in a rectangular shape. The plurality of sidewalls 183 are of a high friction coefficient and are capable of maintaining the edges of the electronic device 200 in the latching chamber 185. In the embodiment, the positing sleeve 18 is made of silica gel.

The sealing cover 19 is received in the locking hole 1331 and abuts against the second resisting portion 1335 to seal the locking hole 1331. In the embodiment, the sealing cover 19 is circular and made of silica gel.

In assembling, the positioning sleeve 18 is received in the latching groove 1151 with the latching chamber 185 toward outside. The plurality of anti-skid members 17 are received in the arcuate grooves 119, 1313 with the frictional surface 171 deviating from the arcuate grooves 119, 1313.

Figure 7:
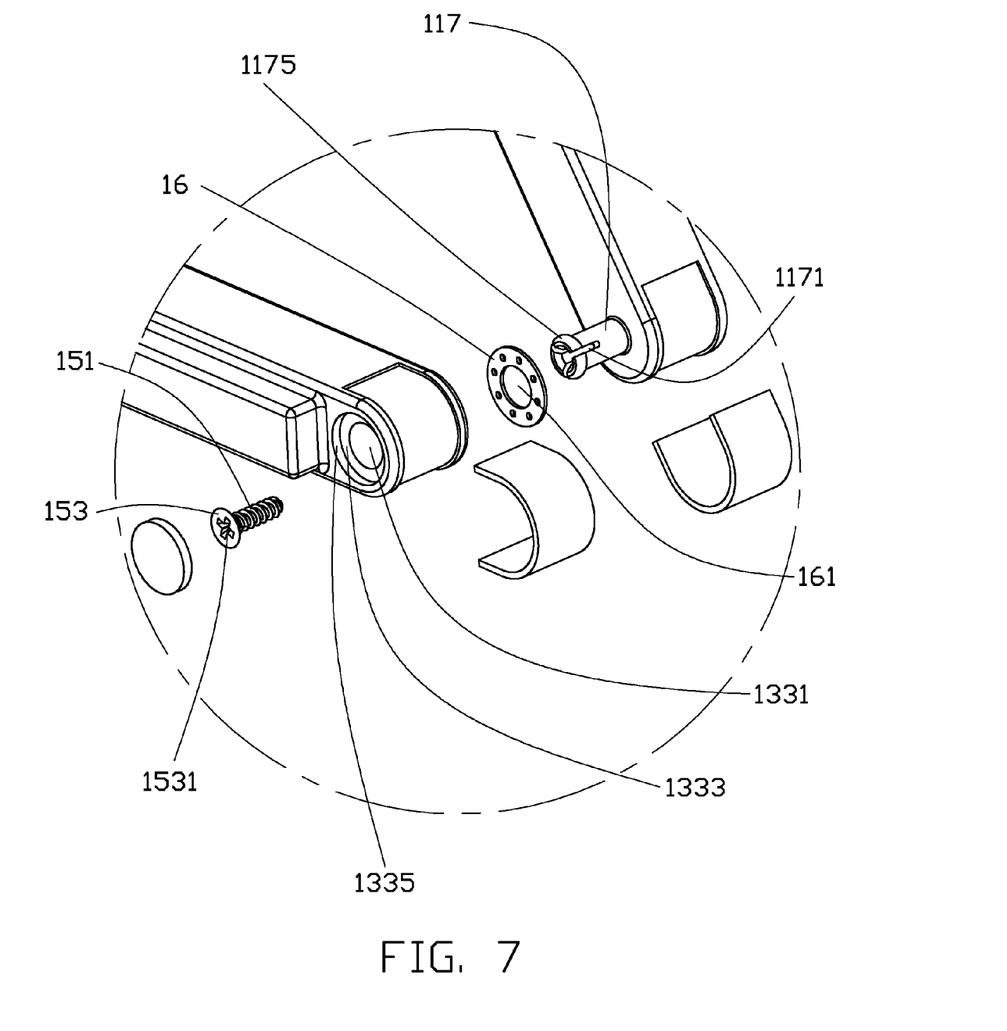
FIG. 7 is an enlarged view of circled portion VII of FIG. 4.

Referring to FIG. 7, the resisting plate 16 is sleeved on the locking portion 117 via the center hole 161. A force is applied to bend the plurality of claws 1175 to gather inwardly, and the locking portion 117 extends into the locking hole 1331 of the support member 13. Releasing the plurality of claws 1175 until the plurality of claws 1175 reach the first resisting portion 1333, thus the plurality of claws 1175 return back and resist the first resisting portion 1333 to prevent the locking portion 117 from detaching from the locking hole 1331. The pivotal member 15 extends into the locking hole 1331 and the receiving hole 1171, the engaging portion 151 engages in the locking portion 117. The driving groove 1531 of the adjusting portion 153 is driven by a tool (not shown), the pivotal member 15 is rotated, then the engaging portion 151 resists the plurality of claws 1175 to bend toward and block the first resisting portion 1333 tightly. The locking portion 117 outwardly extrudes from the sidewalls of the engaging portion 151 to adjust the friction force between the locking portion 117 and the inner sidewalls of the locking hole 1331. The sealing cover 19 is received in the locking hole 1331 and abuts against the second resisting portion 1335 to seal the locking hole 1331. Both of the two support assemblies 10 are assembled in the same way, thus completing the assembly of the support mechanism 100.

When in use, the two support assemblies 10 are symmetrically aligned, the support member 13 is parallel to and positioned on a desk with the plurality of anti-skid members 17. The adjustable member 11 is rotated relative to the support member 13 to a predetermined angle, and opposite edges of the electronic device 200 are received in the latching chambers 185 of the two support assemblies 10, thus the electronic device 200 is maintained in the positioning sleeve 18 via the plurality of sidewalls 183. Referring to FIG. 5, the support mechanism 100 is shown in a first support state. In this state, the support end 113 is away from the desk and the electronic device 200 is substantially perpendicular to the desk.

Referring to FIG. 6, the support mechanism 100 is shown in a second support state. In this state, the electronic device 200 is maintained in the positioning sleeve 18 via the plurality of sidewalls 183, the resisting end 131 of the support member 13 and the support end 113 of the adjustable member 11 abut against the desk to maintain the support mechanism 100. The connecting end 133 of the support member 13 and the joint end 111 of the adjustable member 11 are away from the desk.

In both support states, the display angle of the electronic device 200 can be adjusted by rotating the adjustable member 11 relative to the support member 13. The friction force between the locking member 117 and the inner sidewall of the locking hole 1331 can be adjusted by rotating the pivotal member 15.

Referring to FIGS. 1 through 6, to fold the support mechanism 100, the two support assemblies 10 are pulled away from each other to release the electronic device 200. The adjustable member 11 is rotated relative to the support member 13 until on a plane with the support member 13. The protrusion 137 of one of the two support assemblies 10 is received in the latching chamber 185 of another of the two support assemblies 10, thus the two support assemblies 10 are on the same plane. The support mechanism 100 is then folded for carrying.

The support mechanism 100 can be easily folded and is convenient to carry. The support mechanism 100 includes only two adjustable members 11 and two support members 13, thus the structure and manufacturing of the support mechanism 100 is very simple. When the adjustable member 11 and the support member 13 are worn, and the friction between the locking hole 1331 and the locking portion 117 is decreased. By driving the adjusting portion 153 of the pivotal member 15 to rotate between the locking hole 1331 and the locking portion 117 the friction can be increased. Thus, the support mechanism 100 can have relatively long service life. Moreover, the position sleeve 18 and the plurality of anti-skid members 17 are made of silica gel, it results in a soft feel in the hand and the support mechanism 100 can be located on surfaces which are slightly irregular and even tilted. The sealing covers 19 seal the locking holes 1331 to prevent the pivotal members 15 from being corroded.

The plurality of anti-skid members 17 may be formed in the arcuate grooves 119, 1313 by injection molding. The positioning sleeve 18 may be omitted and the adjustable member 11 includes a plurality of claws made of sticky material on the side wall of the latching groove 1151.

Finally, while various embodiments have been described and illustrated, the disclosure is not to be construed as being restricted thereto. Various modifications can be made to the embodiments by those skilled in the art without departing from the true spirit and scope of the disclosure as defined by the appended claims.

What is claimed is:

1. A support mechanism, comprising:
two support assemblies detachably assembled together between a collapsed configuration and an in-use configuration, each support assembly comprising:
an adjustable member defining an elongated latching groove, the adjustable member comprising a locking portion at an end thereof, the locking portion comprising a plurality of claws extending along a radial direction of the locking portion outwardly;
a support member rotatably connected to the adjustable member an including an elongated protrusion, the elongated protrusion of one of the two support assemblies being received in the latching groove of the adjustable member of another one of the two support assemblies when in the collapsed configuration, the support member defining a locking hole at an end thereof, and comprising a first resisting portion and a second resisting portion at an end of the locking hole, the first resisting portion and the second resisting portion being positioned side by side and cooperatively forming a stepped annular structure; and
a pivotal member, wherein the locking portion of the adjustable member extends into the locking hole of the support member, the pivotal member engages in the locking portion and resists the plurality of claws to bend toward and block the first resisting portion.

2. The support mechanism of claim 1, wherein the adjustable member comprises a joint end, the support member comprises a connecting end, the joint end is rotatably connected to the connecting end via the pivotal member.

3. The support mechanism of claim 2, wherein the locking portion extends from the joint end, the locking portion axially defines a receiving hole, the locking hole is defined in the connecting end and extends through opposite side surfaces thereof, and the pivotal member engages in the receiving hole.

4. The support mechanism of claim 3, wherein the pivotal member comprises an engaging portion, and an adjusting portion opposite to the engaging portion, the plurality of claws is positioned around a periphery of an end of the locking portion, the first resisting portion and the second resisting portion are formed in the joint end, the engaging portion engages in the receiving hole of the locking portion.

5. The support mechanism of claim 4, wherein the adjusting portion defines a driving groove on an end surface away from the engaging portion, the engaging portion is configured to extrude out of sidewalls of the locking portion and the plurality of claws outwardly, the engaging portion is extruded into or out of the locking portions and plurality of claws to increase or decrease friction between the locking portion and inner sidewalls of the locking hole.

6. The support mechanism of claim 2, wherein the support assembly further comprises a plurality of anti-skid members, the adjustable member further comprises a support end opposite to the joint end, the support member further comprises a resisting end opposite to the connecting end, each of the joint end, the support end, the connecting end, and the resisting end defines an arcuate groove to receive one of the plurality of anti-skid members.

7. The support mechanism of claim 6, wherein each of the joint end, the support end, the resisting end, and the connecting end is smoothly rounded, the arcuate groove is respectively located on each arcuate end surfaces of the joint end, the support end, the resisting end, and the connecting end; each of the plurality of anti-skid members is made of silica gel.

8. The support mechanism of claim 6, wherein the adjustable member further comprises two side surfaces connecting the joint end and the support end, the latching groove is defined on one side surface; the support member defines a groove on a first side surface and includes a protrusion on a second side surface opposite to the first side surface, the protrusion of the support member is received in the latching groove of another one of the two support assemblies.

9. The support mechanism of claim 8, wherein each of the two support assemblies further comprises a positioning sleeve received in the latching groove, the positioning sleeve comprises a bottom plate, and a plurality of sidewalls extending from edges of the bottom plate, the bottom plate and the plurality of sidewalls cooperatively define a latching chamber, the protrusion of the support member is received in the latching chamber of another of the two support assemblies when the support mechanism is folded for carrying.

10. A support mechanism, comprising:
two support assemblies detachably assembled together between a collapsed configuration and an in-use configuration, each support assembly comprising:
an adjustable member, the adjustable member comprising a locking portion at an end thereof, the locking portion comprising a plurality of claws extending along a radial direction of the locking portion outwardly;
a positioning sleeve received in the adjustable member, the positioning sleeve defining an elongated latching chamber;
a support member rotatably connected to the adjustable member, the support member comprising an elongated protrusion on a side surface, and the protrusion of one of the two support assemblies being capable of being received in the latching chamber of the positioning sleeve of another one of the two support assemblies, when in the collapsed configuration, the support member defining a locking hole at an end thereof, and comprising a first resisting portion and a second resisting portion at an end of the locking hole, the first resisting portion and the second resisting portion being positioned side by side and cooperatively forming a stepped annular structure; and
a pivotal member, wherein the locking portion of the adjustable member extends into the locking hole of the support member, the pivotal member engages in the locking portion and resists the plurality of claws to bend toward and block the first resisting portion.

11. The support mechanism of claim 10, wherein the adjustable member comprises a joint end, the support member comprises a connecting end, the joint end is rotatably connected to the connecting end via the pivotal member.

12. The support mechanism of claim 11, wherein the the locking portion extends from the joint end, the locking portion axially defines a receiving hole, the locking hole is defined in the connecting end and extends through opposite side surfaces thereof, and the pivotal member engages in the receiving hole.

13. The support mechanism of claim 12, wherein the pivotal member comprises an engaging portion, and an adjusting portion opposite to the engaging portion, the plurality of claws is positioned around a periphery of an end of the locking portion, the first resisting portion and the second resisting portion are formed in the joint end, the engaging portion engages in the receiving hole of the locking portion.

14. The support mechanism of claim 13, wherein the adjusting portion defines a driving groove on an end surface away from the engaging portion, the engaging portion is configured to extrude out of sidewalls of the locking portion and the plurality of claws outwardly, the engaging portion is extruded into or out of the locking portions and plurality of claws to increase or decrease friction between the locking portion and inner sidewalls of the locking hole.

15. The support mechanism of claim 11, wherein the support assembly further comprises a plurality of anti-skid members, the adjustable member further comprises a support end opposite to the joint end, the support member further comprises a resisting end opposite to the connecting end, each of the joint end, the support end, the connecting end, and the resisting end defines an arcuate groove to receive one of the plurality of anti-skid members.

16. The support mechanism of claim 15, wherein each of the joint end, the support end, the resisting end, and the connecting end is smoothly rounded, the arcuate groove is respectively located on each arcuate end surface of the joint end, the support end, the resisting end, and the connecting end; each of the plurality of the anti-skid members is made of silica gel.

17. The support mechanism of claim 15, wherein the adjustable member further comprises two side surfaces connecting the joint end and the support end, and defines a latching groove on one side surface; the protrusion of the support member is received in the latching groove of another one of the two support assemblies.

18. The support mechanism of claim 17, wherein the positioning sleeve is received in the latching groove, the positioning sleeve comprises a bottom plate, and a plurality of sidewalls extending from edges of the bottom plate, the latching chamber is defined by the bottom plate and the plurality of sidewalls.

* * * * *